US007438492B2

(12) United States Patent
Naudet et al.

(10) Patent No.: US 7,438,492 B2
(45) Date of Patent: Oct. 21, 2008

(54) LINK BETWEEN TWO MECHANICAL MEMBERS

(75) Inventors: Jacky Naudet, Bondoufle (FR); Gerard Etoile, Nemours (FR); Frederic Babec, Saint Germain Laval (FR)

(73) Assignee: Snecma, Paris (FR)

( * ) Notice: Subject to any disclaimer, the term of this patent is extended or adjusted under 35 U.S.C. 154(b) by 100 days.

(21) Appl. No.: 10/868,780

(22) Filed: Jun. 17, 2004

(65) Prior Publication Data

US 2004/0265054 A1 Dec. 30, 2004

(30) Foreign Application Priority Data

Jun. 27, 2003 (FR) .................................. 03 07811

(51) Int. Cl.
*F16C 11/10* (2006.01)

(52) U.S. Cl. ....................................... 403/79; 403/374.1

(58) Field of Classification Search ............. 403/109.5, 403/314, 350, 367, 374.1, 78, 322.3, 79; 60/226.1–226.3, 239, 269, 600; 464/114, 464/119
See application file for complete search history.

(56) References Cited

U.S. PATENT DOCUMENTS

| 541,997 | A | * | 7/1895 | Fravega et al. ............... 464/119 |
|---|---|---|---|---|
| 2,299,935 | A | * | 10/1942 | Slack et al. ............ 280/124.134 |
| 3,124,370 | A | * | 3/1964 | Traugott ................. 280/86.756 |
| 3,163,441 | A | * | 12/1964 | Traugott ................. 280/86.753 |
| 3,394,212 | A |   | 7/1968 | Maloney |
| 3,880,444 | A | * | 4/1975 | Bridges .................. 280/86.753 |
| 4,226,550 | A |   | 10/1980 | Kupcak et al. |
| 4,444,365 | A | * | 4/1984 | Heuberger .................... 244/48 |
| 4,753,454 | A | * | 6/1988 | Woehler ................. 280/86.755 |
| 4,813,163 | A | * | 3/1989 | Livingston et al. ............ 37/444 |
| 4,863,187 | A | * | 9/1989 | Artz ...................... 280/86.753 |
| 5,431,540 | A |   | 7/1995 | Doolin et al. |
| 5,779,260 | A | * | 7/1998 | Reilly et al. ............ 280/86.754 |
| 6,068,275 | A | * | 5/2000 | Chino ................. 280/124.112 |
| 6,550,795 | B1 | * | 4/2003 | Schlosser et al. ......... 280/86.75 |

* cited by examiner

*Primary Examiner*—Daniel P. Stodola
*Assistant Examiner*—Joshua T Kennedy
(74) *Attorney, Agent, or Firm*—Oblon, Spivak, McClelland, Maier & Neustadt, P.C.

(57) ABSTRACT

A rigid link of adjustable length includes a yoke with a transversal stud. The stud is mounted on the yoke with two bearings, each inside a through-orifice in the yoke. The axis of the stud is offset from the axis of the bearings whereby the link includes a stopping device in order to lock the stud in at least two different positions, relative to the yoke.

18 Claims, 2 Drawing Sheets

LINK BETWEEN TWO MECHANICAL MEMBERS

BACKGROUND OF THE INVENTION

1. Field of the Invention

The invention concerns a mechanical linking means between a first member and a second member such as a control member and a controlled part.

2. Description of the Related Art

A gas turbine engine includes, for instance, doors blanking off the discharge apertures of the low pressure compressor in order to control the operation thereof. The doors are provided on the external wall of the tunnel downstream of the compressor, and distributed regularly around the axis of the engine. There may be ten, for example. They are mounted generally in order each to tip around an axis situated in a plane transversal to the axis of the engine. Simultaneous opening of the doors is actuated by means of an annular control member, brought into rotation by an appropriate jack. The rotational movement of this ring is transformed into an axial movement by square-shaped transmission parts. A branch thereof is connected to a yoke integral with the door that it controls by dint of a link.

Taking the assembly and manufacture tolerances of the parts into account, a means for adjusting the length of the link actuating each door is required. This means enables to ensure that all the doors occupy the same reference position. Notably, when the control ring is placed in the closing position of the doors, the latter should all be able to blank off the apertures correctly.

With reference to FIG. 1, in the configuration of the current state of the art, a link 1' includes a fastening ring 30' at one end and a yoke 20' at the other end. It is composed of two sections: the ring is provided with a threaded rod 31' co-operating with a tapered orifice 11' in the yoke 20'. The length of the link 1' is adjusted by rotating one part relative to the other and both parts are immobilised together by means of a nut 32' locking a washer 33' slid onto the threaded rod 31'. The nut 32' is locked, for its own part, by a metal wire. The assembly and the adjustment of the link are not easy since one of the attachments must be released in order to proceed to the adjustment in length. The adjustment accuracy is determined; it is given by the variation in length generated by the rotation over half a turn. In this example, the adjustment is 0.45 mm by semi-turn.

This type of link exhibits the shortcoming in aeronautics that it must be made of a suitable material compatible with a threading. Steel is therefore used. However, the mass of this metal is high with respect to other metals used generally in this field, and especially it is corrosion sensitive. Besides, the link is composed of five different parts, which is a detrimental factor in terms of management and maintenance.

SUMMARY OF THE INVENTION

The purpose of the applicant is to provide a rigid link between a first member and a second member, including a means for adjusting the distance between both members, said link including a yoke with a stud co-operating with a fastening tab on the first member.

This target is met thanks to a link whereof the stud is mounted on the yoke by bearing-forming means inside a recess laid out on the yoke, whereas the axis of the stud and the axis of the bearing-forming means are not confused, whereby the link includes stopping means in order to lock the stud in at least two different positions, relative to the yoke.

The link of the invention advantageously dispense with threaded parts. Consequently, a metal lighter than steel may be used, an aluminium-based alloy for example. The latter, besides, resists to corrosion much better than steel. The production of the link is also simplified since it may be composed of a single piece, where the adjustment means are transferred to the assembly yoke. The structure of this link also enables an adjustment at least equal to the requirements set, in situ, without the adjuster having to dismantle the link at one of its ends.

This invention is described for a rigid transmission link between a ring controlling the flow discharge doors of a compressor. However, it may be extrapolated to any application implementing a rigid transmission link whereof the length may be adjusted at predetermined positions.

BRIEF DESCRIPTION OF THE DRAWINGS

Other features and advantages will appear when reading the following description of an embodiment of the invention, with reference to the appended drawings whereon.

DETAILED DESCRIPTION OF THE PREFERRED EMBODIMENTS

Figure 1:
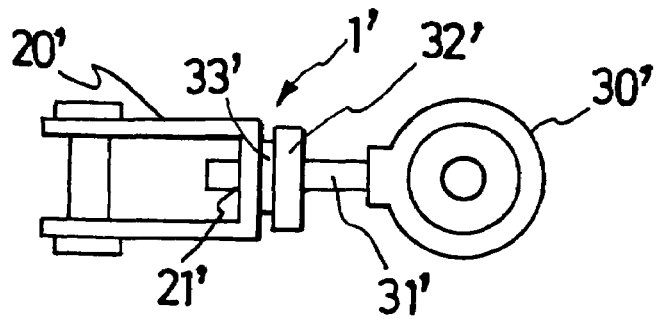
FIG. 1 shows a side view of a link of the previous art.
Figure 2:
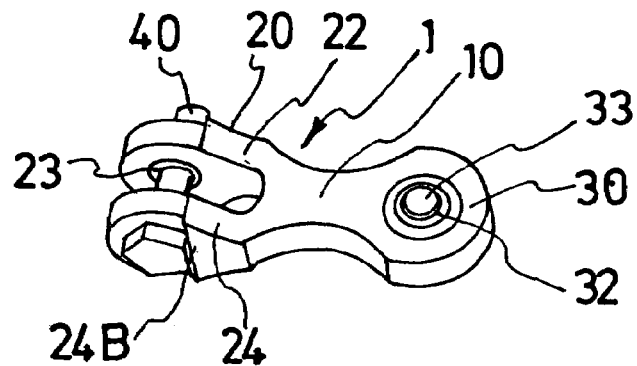
FIG. 2 shows a perspective view of the link of the invention.
Figure 3:
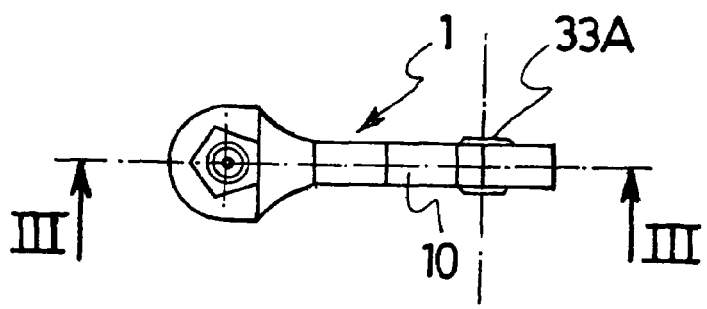
FIG. 3 shows a side view of the link according to FIG. 2.

The link 1 of the invention includes a body with a stem-shaped element 10 extended on one side by a yoke-shaped attachment means 20 for assembly on a fastening tab integral with a first mechanical member, not represented. It may be for instance, a discharge door of a low pressure compressor in a gas turbine engine. At the other end, the stem is integral with a ring 30 fitted with a ball-joint 32 for assembly on a fastening tab integral with a second member to be connected to the former. The ball-joint 32 is drilled with a cylindrical aperture 33 of axis 33A for accommodating a stud, not represented, for attaching the second member to said fastening tab. It may be the square or the bellcrank connected to the discharge door control ring of the compressor.

Figure 4:
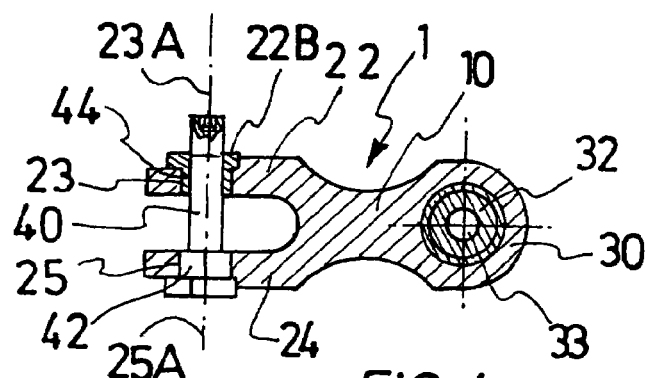
FIG. 4 shows a sectional view of the link along the direction III-III of FIG. 3.
Figure 5A:
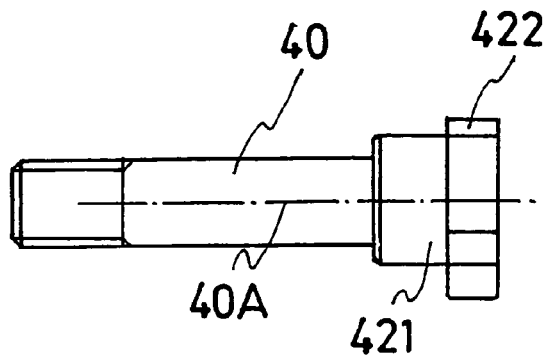
FIG. 5A shows a side view of the stud of the invention.
Figure 5B:
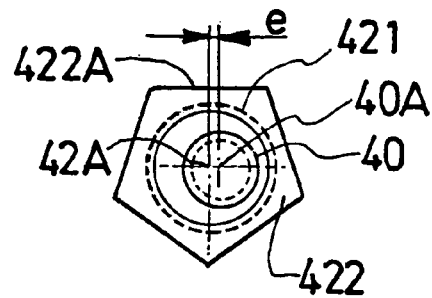
FIG. 5B shows an axial view of the stud of FIG. 5A.

As can be seen on FIG. 4, the yoke 20 is composed of two fastening tabs 22 and 24 parallel relative to one another and each fitted with a circular through-orifice 23 and 25 of axes 23A and 25A. The axes 23A, 25A of both orifices 23, 25 are collinear. A stud 40 is mounted on the yoke between both tabs by bearing-forming means 42 and 44. The stud 40, as can be seen on FIG. 5, is cylindrical in shape with a circular section, of axis 40A. A bearing-forming means 42 is here interconnected with the stud 40 and is integral part therewith. The second means 44 is mounted slidingly on the stud. The first means 42 includes a cylindrical bearing surface 421 with a circular section. Its axis 42A is parallel to the axis of the stud 40A. Both axes 40A and 42A are not collinear; they are apart from one another by a set distance 'e'. The first means 42 also includes a portion forming a bearing head 422. This head is also cylindrical with at least one plane surface 422A forming a stop. This surface 422A is parallel to the axis 42A of the bearing surface.

Figure 5C:
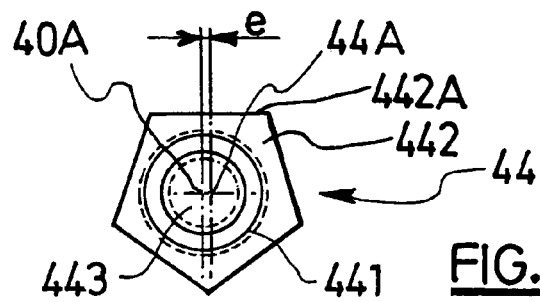
FIG. 5C shows an axial view of the bearing-forming means associated with the stud of FIG. 5B, FIGS. 6A and 6B show, at another scale, embodiment variations of two heads enabling different adjustments.

The second bearing-forming means 44, as can be seen on FIG. 5C, is composed of a circular cylindrical portion 441 of axis 44A confused with the bearing axis 42A of the first means 42. The cylindrical portion is provided with an orifice 443 centred on the axis of the stud 40. The second means 44 also includes a head 442 with, like the first head, at least one plane stopping surface 442A parallel to the axis of the stud.

The external surface of the branch 22 of the yoke 20 comprises a stopping means 22B, here in the form of a plane surface. Its distance to the axis 23A of the orifice 23 provided in the branch 22 is slightly greater than or equal to the distance between the stopping surface 442A, on the head 442, of the bearing-forming means 44.

Similarly, the external surface of the branch 24 of the yoke 20 includes a stopping means 24B. Its distance to the axis 25A of the orifice 25 provided in the branch 24 is slightly greater than or equal to the distance between the stopping surface 422A, on the head 422, of the bearing-forming means 42.

As can be seen on FIG. 5C; the surface of the cylindrical bearing 441, seen from above, forms a circle like the cylinder of the stud. The centre of the cylinder 40 is offset relative to the centre of the bearing circle 441. On FIG. 4, the surface 442A abuts against the stopping surface 22B. Similarly, the stopping surface 422A abuts against the stopping surface 24B on the other tab of the yoke.

The heads 422 and 442 have in this embodiment a pentagonal shape and include each five stopping surfaces 422A to E and 442A to E.

According to the arrangement of the stud relative to the yoke, the distance between the axis 40A of the stud and the axis 33A of the ball-joint is adjusted. In this embodiment, there are three adjustment lengths. It suffices to place the heads 442 and 422 in the appropriate position to present the suitable pair of stopping surfaces, 442A-422A, 442B-422B, 442C-422C, 442D-422D or 442E-422E.

A link is used as follows in the example of control system for the discharge doors of a low pressure compressor of a gas turbine engine. The doors are in a position blanking off the apertures. For each door, a control square has been mounted on the casing so that said square may rotate around an axis with radial direction. One end of the square is integral with the ring controlling all the doors. The other end is connected by dint of the link to the corresponding door.

One starts by installing the link by the end including the ring, then one places the yoke at the other end, facing the fastening tab of the second member. The stud 40 is slid through the orifices 23 and 25 of the yoke 20 and rotated around its axis until it finds the appropriate stopping surface of its head 422. The distance between the axes 33A and 40A corresponds to the reference distance between both members to be connected with an accuracy related to the eccentricity 'e'. When the head 422 is in place, one inserts the second member 44 into the same position.

A stud has been described with an integral bearing means 42. The invention also includes the variation not represented where said means is distinct, like the second bearing means 44.

This first embodiment includes heads pentagonal in shape, enabling three adjustment positions of the distance between the axes 33A and 40A. It can be understood that one may choose other positions between the offset-centres or other polygonal shapes; in particular, the heads may be square or hexagonal in shape, for another number of adjustment positions.

This present invention advantageously enables to suit the adjustment accuracy to the application easily. The stud whereof the head has an appropriate number of adjustment positions is then selected.

Figure 6A:
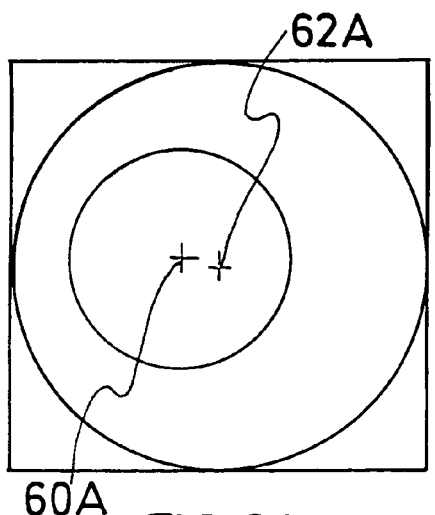
Figure 6B:
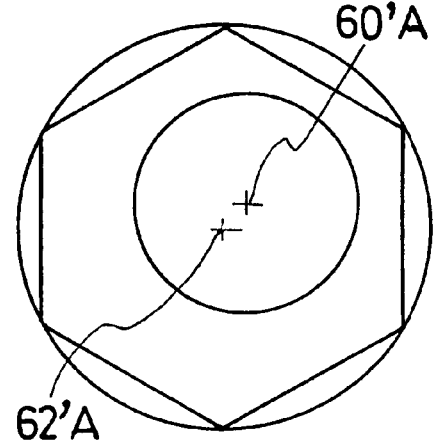

On FIG. 6A, for instance, the head of the bearings is square. The axis 60A of the stud is offset relative to the axis of the bearing 62A. The adjustments in this arrangement are three in number. In the example of FIG. 6B, the head of the bearings is hexagonal. The axis of the stud 60'A is offset relative to the axis 62'A of the bearing, the adjustments are here four in number.

The invention claimed is:

1. A rigid link of adjustable length, said rigid link comprising:
   a ring configured to receive a fastening element;
   a stem that extends from the ring to a yoke that includes a first tab and a second tab that are joined together at the stem, said first tab including a first through-orifice and said second tab including a second through-orifice, each of said first tab and said second tab including a first outer face and a second outer face, the second outer face being recessed from the first outer face so as to define a plane surface that extends from the first outer face to the second outer face;
   a first bearing located in said first through-orifice, said first bearing including a first bearing axis;
   a second bearing located in said second through-orifice, said second bearing including a second bearing axis, said first and second bearing axes being collinear;
   a transversal stud mounted between said first and second bearings and on the yoke via said first and second bearings, said transversal stud including a stud axis that is offset from the first and second bearing axes by a set distance, wherein an operative distance between said ring and said stud axis is adjustable by rotation of said stud about the bearing axis between at least two different angular positions, and
   wherein each of said first and second bearings includes surfaces forming stops that respectively engage said plane surfaces of said first tab and of said second tab so as to prevent rotation of the transversal stud relative to the yoke in said at least two different angular positions.

2. A rigid link according to claim 1, wherein at least one of said first and second bearings is formed homogeneously with the transversal stud.

3. A rigid link according to claim 1, wherein each of said first and second bearings includes at least four surfaces, each forming a stop configured to respectively engage said plane surfaces of said first tab and of said second tab.

4. A rigid link according to claim 3, wherein the at least four surfaces are arranged as a polygon.

5. A rigid link according to claim 4, wherein the polygon includes four to six sides.

6. A rigid link according to claim 1, wherein said first tab of said yoke, said second tab of said yoke, and said stem of said yoke are formed homogeneously so as to not include any boundaries therebetween.

7. A rigid link according to claim 1, wherein the first bearing is homogeneously formed with said transversal stud and said second bearing is slidingly mounted on said transversal stud.

8. A rigid link according to claim 1, wherein said yoke, said first and second bearings, and said transversal stud form only three separable parts.

9. A rigid link according to claim 8, wherein said first tab, said second tab, and said stem are formed homogeneously with said yoke, and said first bearing is formed homogeneously with said transversal stud.

10. A rigid link according to claim 1, wherein said plane surface of said first tab and said plane surface of said second tab are configured to lock the transversal stud in three different angular positions, relative to the yoke.

11. A rigid link according to claim 10, wherein a distance between said ring and said stud axis differs for each of said three different angular positions.

12. A rigid link according to claim 1, wherein said plane surface of said first tab and said plane surface of said second tab each extend substantially perpendicular to each of said tabs.

13. A rigid link according to claim 1, wherein a distance between said ring and said stud axis is indexed to each of the at least two different angular positions.

14. A rigid link according to claim 1, wherein said plane surface of said first tab directly contacts one of the surfaces forming stops of the first bearing, and wherein said plane surface of said second tab directly contacts one of the surfaces forming stops of the second bearing.

15. A rigid link according to claim 1, wherein said first and second outer faces are substantially parallel.

16. A rigid link according to claim 1, wherein said plane surface of said first tab extends substantially parallel to the stud axis.

17. A rigid link according to claim 16, wherein said plane surface of said second tab extends substantially parallel to the stud axis.

18. A rigid link according to claim 1, further comprising a ball-joint that is fitted in the ring.

* * * * *